United States Patent
Rowen et al.

[11] Patent Number: 6,164,057
[45] Date of Patent: Dec. 26, 2000

[54] GAS TURBINE GENERATOR HAVING RESERVE CAPACITY CONTROLLER

[75] Inventors: William Irwin Rowen, Schenectady; Raj Kumar Anand, Ballston Lake; Richard J. Wooding, Delanson, all of N.Y.

[73] Assignee: General Electric Co., Schenectady, N.Y.

[21] Appl. No.: 09/270,744

[22] Filed: Mar. 16, 1999

[51] Int. Cl.[7] .................................................. F02C 9/00
[52] U.S. Cl. ........................ 60/39.27; 60/39.27; 60/39.03
[58] Field of Search ............................. 60/39.02, 39.03, 60/39.23, 39.27, 39.29, 39.28

[56] References Cited

U.S. PATENT DOCUMENTS

| | | | |
|---|---|---|---|
| 5,203,159 | 4/1993 | Koizumi et al. | 60/39.02 |
| 5,636,507 | 6/1997 | Rajamani et al. | 60/39.03 |
| 5,896,736 | 4/1999 | Rajamani | 60/39.03 |

*Primary Examiner*—Charles G. Freay
*Assistant Examiner*—William Rodriguez
*Attorney, Agent, or Firm*—Nixon & Vanderhye

[57] ABSTRACT

A controller is disclosed that operates a gas turbine such that a desired reserve power capacity is maintained. The inlet guide vane angle of the compressor is applied as an indicator of the reserve capacity of the gas turbine. The actual inlet guide vane angle is continuously compared to an intended inlet guide vane angle that corresponds to a desired reserve capacity. A controller adjusts the fuel flow to the gas turbine to adjust the turbine output power and thereby maintain the actual inlet guide vane angle at the intended value corresponding to the desired reserve capacity.

5 Claims, 2 Drawing Sheets

GAS TURBINE GENERATOR HAVING RESERVE CAPACITY CONTROLLER

BACKGROUND AND SUMMARY OF THE INVENTION

The present invention relates to gas turbine driven power generators and, in particular, to techniques for regulating the reserve capacity of the electric power generator.

Utility companies and independent power producers (IPP) use gas turbines to generate electrical power. Gas turbines generate electrical power by turning generators. The power is distributed over power grids to customers who buy the power. The utilities and IPP are often required to hold in reserve a defined amount of their capacity to generate power.

For example, to participate in a system frequency regulation program, an IPP must hold in reserve a specific percentage of its power generation capacity. The reserve capacity is maintained so that the IPP is able to apply additional power from its reserve capacity when the grid frequency declines. The benefit to the IPP for participating in the frequency regulation program is that the IPP receives financial or other compensation from the connected utility. The requirement for a reserve capacity may also be imposed by contract, such as where the utility requires that its gas turbines operate at a part load capacity, for instance 95% of the total power capacity of the turbine.

To maintain a certain percentage of its power generation capacity in reserve, the IPP must know the total available capacity of its gas turbine on an ongoing basis. The available capacity of a gas turbine based power plant is highly dependent on the ambient conditions, e.g., temperature and barometric pressure, at the power plant. Other factors that affect the capacity of a gas turbine include the gas turbine's condition, e.g. cleanliness, of the compressor, turbine degradation, fuel type and quality. All of these factors are variable and difficult to reliably predict.

CHARACTERISTICS OF ELECTRICAL POWER SYSTEMS

In a single shaft gas turbine, driving a generator that is electrically connected to a large alternating current grid, the grid frequency determines the speed of the connected gas turbine generator. The mechanical output power of the gas turbine, and the resultant electrical power supplied to the grid by the generator are determined by the fuel flow to the gas turbine combustors. The gas turbine internal and exhaust temperatures resulting from this combustion are a function of both the fuel flow to the combustors and the air flow fed to the combustors from the gas turbine compressor.

The gas turbine control system regulates the fuel flow to produce the desired output, while limiting maximum fuel flow to ensure acceptable operating temperatures over the expected range of ambient and machine conditions. Within this maximum limit, the control system regulates operating temperatures by varying air flow over a limited range to optimize part load exhaust temperatures for beat recovery applications.

The fuel flow control that determines gas turbine generator output is an extension of the speed control, or governor function that is used to control gas turbine generator speed prior to connecting it to the power grid. This allows a smooth transition during gas turbine startup and synchronizing to the grid. The governor functions as a straight proportional controller with a very narrow proportional band, typically 4% to 7%, and is commonly referred to as a "droop" governor, with the droop equal to the proportional band. The proportionality of the governor causes the fuel flow to the gas turbine combustors to increase and decrease, within the allowable limits, so that the gas turbine will share load in proportion to its rating with other connected generators as the grid system frequency varies in response to changes in the power demand placed on the grid.

FUNCTIONAL DESCRIPTION OF THE INVENTION

Determining the actual capacity of a gas turbine has been difficult because the capacity is dependent on ambient conditions and other variable factors. A conventional approach to determining the capacity of a gas turbine is to run it at full load and measure its maximum power output. The measured maximum capacity is required to determine the reserve capacity at any given time. The shortcoming of this conventional approach is that the actual maximum capability is not available to dynamically adjust the gas turbine to maintain a selected reserve capacity, since it requires the turbine to be periodically operated at maximum capacity (which is incompatible with a system frequency regulation mode of operation wherein a certain amount of reserve capacity is to be maintained); and is difficult to perform on a regular basis, e.g., daily, without unduly interfering with the normal operation of the gas turbine.

The capacity of a gas turbine will change over time. Ambient conditions change with the weather and the season. Weather changes alter the available capacity of the gas turbines at the power plant. The other mechanical factors that effect the available capacity of a gas turbine also change over time. It has been exceedingly difficult to determine and maintain a precisely selected reserve capacity for a gas turbine because of the difficulty in determining its current maximum capacity of the turbine. Accordingly, there is a long-felt need for a technique to accurately determine the maximum power capacity and reserve capacity available in an operating gas turbine on a real time basis.

Applicants undertook a thermodynamic analysis of gas turbines to determine which operating conditions are indicative of the reserve capacity of the turbine. Applicants discovered that the angle of the inlet guide vanes (IGV's), when not fully open, can be indicative of the reserve capacity. The IGV angle showed a fairly consistent relationship to the reserve capacity of a gas turbine over a variety of ambient conditions, e.g., temperatures and barometric pressures. By holding the IGV angle constant, the reserve capacity of the gas turbine was also held relatively constant over a wide range of ambient conditions.

The relationship between IGV angle and reserve capacity was found to be particularly strong for gas turbines operating in a heat recovery mode. To recover heat exhausted from the gas turbine, the exhaust gases are typically passed over the water filled tubes of a "Heat Recovery Steam Generator", where steam is produced that can be used for the production of additional power in a steam turbine, or used directly as the heat source for a process.

In the heat recovery mode, the angle of the IGV's is modulated to maximize the exhaust temperature of the turbine, and recovered exhaust energy, thereby optimizing the overall part load heat rate. The air flow, and thus exhaust temperature is affected by the ambient conditions at the gas turbine compressor inlet. By modulating the angle of the IGV's to maximize the exhaust temperature, the IGV angle is indirectly adjusted to compensate for changes to the ambient conditions. By adjusting the IGV to indirectly to account for ambient conditions, the angle of the IGV is believed to be a fair indicator of the reserve capacity of the gas turbine. Accordingly, the reserve capacity of the gas turbine can be adjusted and/or maintained by adjusting the angle of the IGV, especially for a gas turbine operating in a heat recovery mode.

Applicants have devised a reserve capacity controller that adjusts the operating conditions of the gas turbine to maintain a certain IGV angle on a long-term basis, and thereby maintain a desired average reserve power generation capacity. A turbine operator may, for example, select a certain percentage of the reserve capacity when the turbine is to operate in frequency control (F.C.) mode. F.C. mode is used when the gas turbine is to operate pursuant to a system frequency regulation program. The percentage of reserve capacity that is selected by the operator is converted by the controller to a desired IGV angle command. The desired IGV angle is compared to the actual IGV angle. If there is a difference between the desired IGV angle and the actual angle, then the controller generates a correction signal that is input to a proportional-plus-reset gas turbine control algorithm. The control algorithm is executed by the gas turbine controller and is used to control the fuel flow to the combustor in the gas turbine. By adjusting the fuel flow, the controller causes the power of the gas turbine to change, which in turn results in a corresponding change to the IGV angle. The controller adjusts the fuel flow to maintain the IGV angle corresponding to the selected reserve capacity.

The gas turbine controller integrates the output of the control algorithm to reduce to zero the input error signal from the IGV controller. The output of the control algorithm is integrated by adding the output to speed/load governor. In particular, the IGV error signal is algebraically summed to the IGV correction signal and with the turbine load feedback signal to generate an error signal that is input to the algorithm executed by the fuel control. By adding the output of the control algorithm to the speed/load set point, the governor adjusts the fuel flow to the combustor to compensate for the change of the set point. The fuel flow is adjusted until the IGV error value is reduced to zero at which point the angle of the IGV corresponds to the angle for the selected reserve power capacity.

One of the advantages provided by the present invention is that the governor for the gas turbine responds to short term changes in system frequency and can still be used to maintain a constant, average reserve capacity. The frequency, or speed of the electrical alternations, of the connected grid system is determined by the balance of generated and used power, or system load. If the generated power is less than the connected load, then the system frequency declines at a rate that is proportional to the difference. Reserve capacity in the generators ensures that electrical power capacity is always available to match unexpected load increases or loss of generators due to unexpected shutdowns.

In particular, a proportional-plus-reset control algorithm may be used to control the gas turbine in conjunction with a droop governor for system load sharing provided by the load feedback signal. The droop governor monitors the speed of the gas turbine and connected system and adjusts the fuel flow to the combustor to control the turbine's output power. Load sharing refers to the ability of all generators connected to a grid system to respond proportionally to their individual ratings when an unbalance between load and generation exists on the system. This arrangement of a proportional-plus-reset algorithm and a droop governor with a load feedback signal is generally referred to as a "constant settable droop" governor. The invention is not limited to gas turbines operating with constant settable droop governors, and will also work with conventional droop governors where the IGV error signal may be added to the governor set point and with other gas turbine arrangements.

The IGV angle correction controller may be set to correct for relatively long-term, e.g., several hours or days, changes in the ambient conditions. Changes to the ambient conditions, such as temperature and barometric pressure, occur slowly over several hours and days. Accordingly, adjustments to correct for changes to the ambient conditions need only be made relatively infrequently, such as once every three to six hours.

The variations in grid system frequency, on the other hand, are short term disturbances caused by system power unbalances that occur in the time frame of seconds, and require a fuel flow change from the governor in a much more responsive manner. The proposed invention addresses both needs by setting the IGV controller with a very long response time, while utilizing the normally fast response of the governor to respond to grid system frequency variations. Both short and long term actions occur simultaneously and continuously, with the IGV controller establishing a time averaged output power level, or mean value, about which the governor alters fuel flow to meet the short term frequency control requirements of the connected grid.

Furthermore, the error correction applied to adjust the angle of the IGV may be limited to reduce its potential effect on the speed of the gas turbine. For example, the IGV correction may be restricted to changing the turbine power by plus or minus three percent of the total output of the gas turbine. Applying an appropriate limit, e.g., 3%, to the adjustment applied to correct for the IGV angle should be sufficient to allow the reserve capacity of the gas turbine to be maintained within acceptable limits, and operate the gas turbine within a normal combined cycle operating load range of 50% to 125% of the site rating. The normal combined cycle load range represents the normal operating conditions of a gas turbine driving an electric power generator. The site rating is the nameplate rated power generation capacity for the gas turbine and generator.

A gas turbine may be placed in a mode to participate in the system frequency regulation program by sending a "frequency control" (F.C.) command signal to the controller from the operator. The F.C. command causes the controller to establish a reserve capacity setpoint to maintain a certain IGV angle that corresponds to the desired reserve capacity of the gas turbine will be maintained at a value corresponding to the IGV angle. The setpoint will be applied to maintain a specified reserve capacity when the gas turbine is being operated under a system frequency regulation program. The setpoint for the reserve capacity is converted by the controller to a desired IGV angle.

The present invention enables a gas turbine to be operated such that a selected reserve capacity is maintained as ambient and internal turbine conditions change. This ability to maintain a reserve capacity is especially useful when operating a gas turbine in a system frequency regulation program that requires that a certain power generation capacity be reserved. Accordingly, the present invention fulfills a long-felt need for a gas turbine controller that will dynamically hold in reserve a selected capacity of the gas turbine.

DETAILED DESCRIPTION OF THE DRAWINGS

Figure 1:
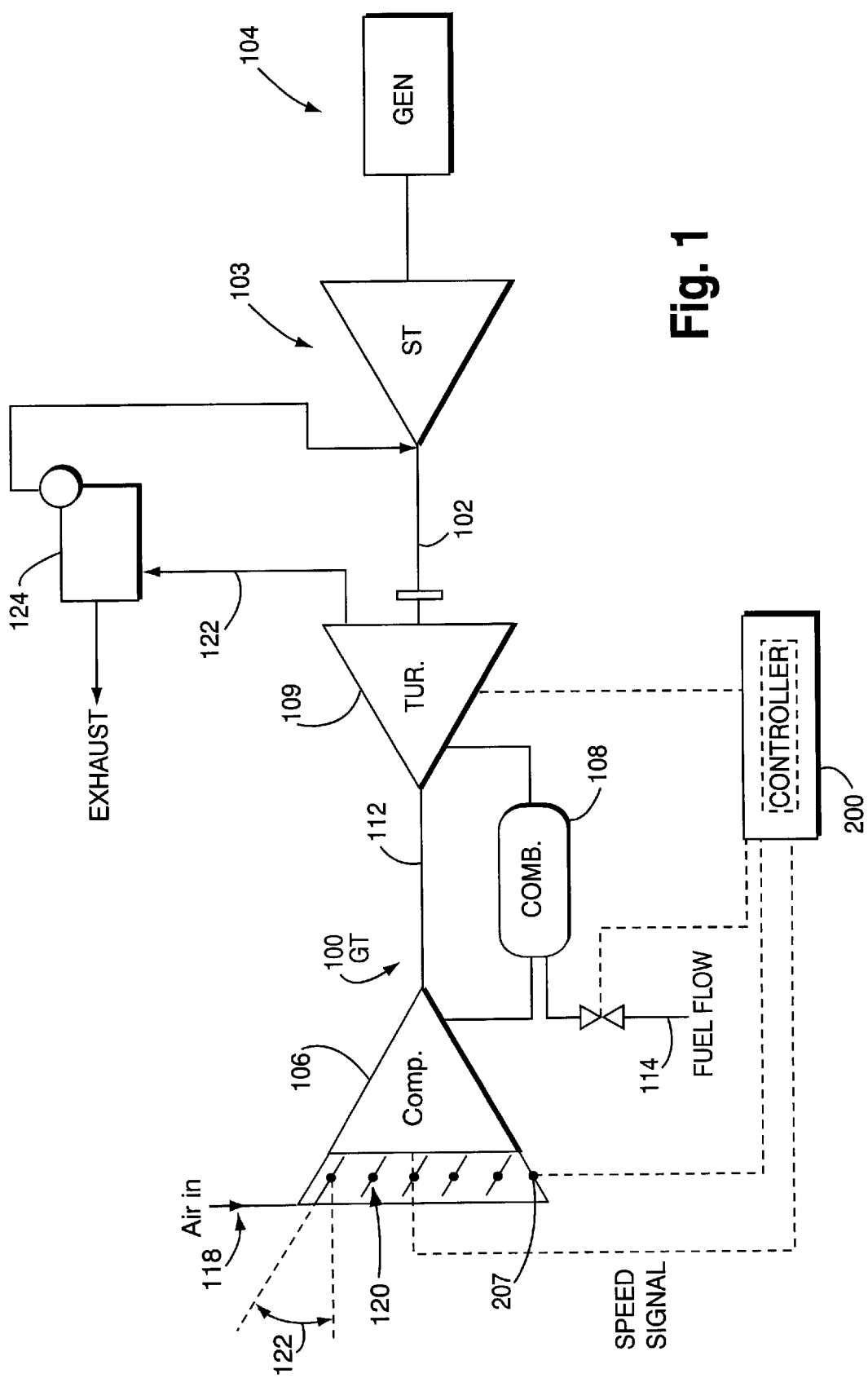
FIG. 1 is a block diagram showing a power generation gas turbine, operating in heat recovery mode, and driving an electric generator.

FIG. 1 shows a gas turbine 100 having an output shaft 102 that drives an electric power generator 104 through a steam turbine 103. The gas turbine includes a compressor 106, a combustor 108 that receives high-pressure air from the compressor, and a turbine 109 that receives combustion gases from the combustor. The compressor and turbine are coupled by a common shaft 112, which is directly connected to the output shaft.

Fuel is injected into the combustor via a fuel line 114 to nozzles in the combustor. The fuel and air mix and burn in the combustor to form combustion gases that flow to the turbine. The turbine 109 is rotationally driven by hot combustion gases from the combustor. The rotation of the turbine 109 turns the compressor 106 which, in turn, compresses air for the combustor. The turbine applies excess energy from the combustion gases, which is not required to drive the compressor, to drive the output shaft 102 where it is combined with the power produced by the steam turbine 103, and then drives the generator 104 which in turn generates electrical power.

The inlet air system 118 to the compressor 106 includes inlet guide vanes (IGV's) 120 that control the inlet air flow to the compressor. The angle 122 of the IGV's is adjusted to match the air flow rate through gas turbine 100 to that which maximizes the temperature of the exhaust flow 122 to the allowable maximum temperature. The angle of the IGV's is sensed by an electro-mechanical sensor.

In the heat recovery mode, the heat from the gas turbine exhaust is ducted to a heat recovery steam generator 124, which produces steam that is piped to the steam turbine 103 to produce additional electrical power in the generator 104, usually without the combustion of additional fuel.

A controller 200 governs the fuel flow to the combustor and sets the angle of inlet guide vanes (IGV) 122 at the inlet to the compressor. The controller 200 may monitor several of the operating parameters of the gas turbine, such as the turbine exhaust temperature, fuel flow, air pressure in the compressor, shaft speed and acceleration, conditions of the steam turbine and generator and other operating parameters. An exemplary controller is the Speedtronic™ Mark V™ controller developed and sold by the General Electric company.

Figure 2:
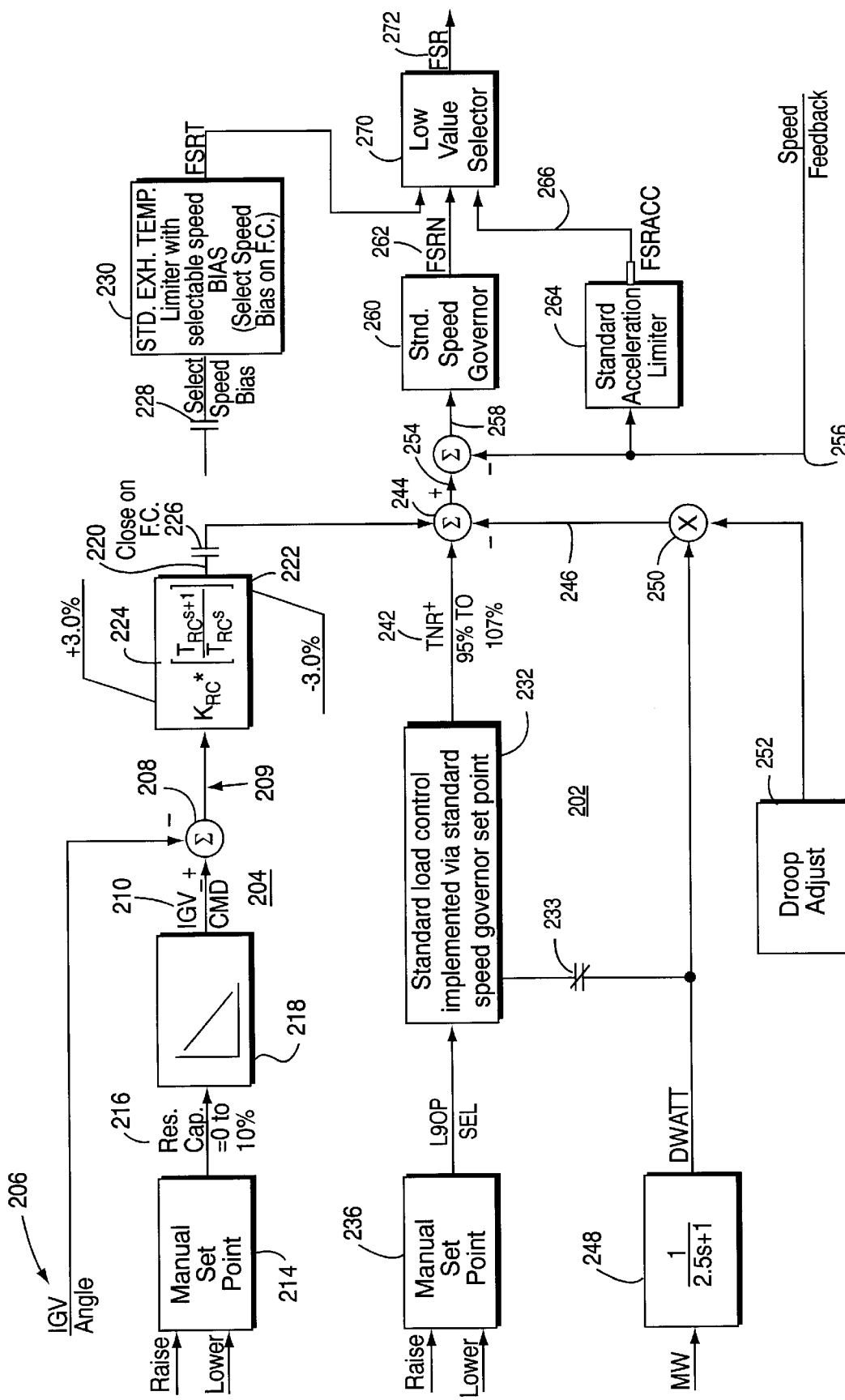
FIG. 2 is a block control diagram of a constant settable droop governor that is a first embodiment of the present invention.

FIG. 2 shows a block diagram of a controller 200 that incorporates an embodiment of the present invention. The controller includes a speed/load governor 202 and an inlet guide vane (IGV) controller 204. The IGV controller receives a signal 206 indicative of the actual inlet guide vane angle from the normal sensor that detects the IGV angle. The IGV controller 204 continuously generates a difference signal between the actual IGV angle 206 and the desired angle (IGV_CMD) 210 in summer 208. This error signal 209 is acted upon by proportional plus integral controller 222 using transfer function 224, which includes adjustable proportional gain $K_{RC}$ and adjustable reset rate $T_{RC}$.

The desired IGV angle signal 210 is determined from a manually (or automatically) set reserve capacity value. In particular, an operator adjusts a manual set point input device 214 by raising or lowering the desired reserve capacity value for the gas turbine. The reserve capacity value is expressed as a percentage of the total current capacity of the gas turbine, and is generated as an output signal 216 of the manual set point input device 214. There may be a maximum range of, for example, 0% to 10%, reserve capacity that may be selected by the operator.

The set point output signal 216 is the input to a processor 218 that performs an algorithm to generate an output signal which is the desired IGV angle signal 210. An exemplary algorithm is that the desired IGV angle signal 210 is equal to 88° (degrees) minus a constant factor of 1.8 times the percentage reserve capacity selected by the operator. For example, the desired IGV angle signal would be 79° for a selected reserve capacity of 95%, assuming that the constant factor is 1.8.

The IGV controller 222 may be implemented by the processor used in a General Electric Speedtronic™ controller. The output 220 of controller 222 is used to modify the speed/load set point 242 produced by the speed/load controller 202 to alter the governor set point 254 in a manner to minimize the IGV error signal 209. In addition, the IGV error correction signal is constrained by upper and lower limits, such as a change of +/−3% in the speed/load control error signal by output limits incorporated into controller 222.

The IGV control signal 220 represents the adjustment to the output power of the gas turbine that is needed to adjust the angle of the inlet guide vanes (IGV) to the angle that corresponds to the desired reserve capacity. The adjustment to the IGV angle (and therefore air flow) of the gas turbine will translate to an IGV angle setting that matches the desired IGV angle. The adjustment to the output power of the gas turbine is accomplished by altering fuel flow to the combustors. The change in fuel flow alters the gas turbine exhaust temperature, which is measured by other portions of the fuel control 200, which in turn cause the IGV position control to move the IGV's in a direction to maximize the gas turbine exhaust temperature for optimum heat recovery. This portion of the system is not a subject of this patent application.

Applicants have identified a strong correlation between the angle of the IGV and the available reserve capacity of the gas turbine. By adjusting the operation of the gas turbine, such as by adjusting the output power, to maintain a desired angle on the IGV, applicants are able to operate the gas turbine with a desired reserve capacity level. This result is particularly surprising because the angle of the IGV was not previously used to set the operating point of a gas turbine. Rather, the angle of the IGV was set automatically according to the exhaust temperature of the gas turbine. In the past, the operator did not select a particular IGV angle and did not use the IGV angle as corresponding to some other selectable operating condition. Accordingly, applicants have devised a new gas turbine control function that uses the angle of the IGV to control an operating condition, e.g., reserve capacity, that is selected by the operator.

The gas turbine is operated to maintain a pre-selected reserve capacity (or IGV angle) when the turbine is operating in frequency control (F.C.) mode. A certain amount of reserve capacity is required when a gas turbine operates in F.C. mode. The IGV controller 204 is used to maintain the desired reserve capacity, but is operatively isolated from the controller 200 by switch 226 when the gas turbine is not operating in F.C. mode. When not in F.C. mode, the controller may operate the gas turbine at a selected output power by the conventional speed/load control 202.

When the IGV controller is operational in F.C. mode, a switch 228 allows a gas turbine standard exhaust temperature limiter controller 230 to incorporate a speed bias signal so that the temperature controller will be sensitive to the speed of the gas turbine, and therefore system frequency. This permits the gas turbine to compensate for the reduced air flow that occurs at reduced speed until the system frequency returns to the normal level. This modification of the temperature control system is not part of the current application.

The load controller 232 includes a manual set point input device 236 that allows an operator to raise or lower the normal load set point for the gas turbine. The output of the load controller 232 is generated by the standard load control algorithms and is designated as TNR 242. The output (TNR) of the standard speed/load set point controller is a speed error signal that can be linearly related to power demand, and therefore fuel flow. The TNR signal 242 is typically constrained to a certain range, e.g. 95% to 107%.

The load controller output signal 242 is summed 244 with the IGV speed control signal 220, and an output signal 246 that is the product of a signal representing the power produced by the generator coupled to the gas turbine and the desired governor droop. The generator output power feedback signal representing megawatts (MW) is filtered and converted to a digital value named DWATT 248 and applied to the load controller 232, where the signal is compared to the load set point when not operating in the F. C. mode. In addition, the generator output feedback signal (DWATT) is multiplied 250 with an output signal from the droop adjusting unit 252 to generate the load feedback signal 246 that ensures proper load sharing with other generators connected to the grid.

The sum 244 of the speed set point output (TNR) 242 and the IGV controller output 220, minus the droop-modified power feedback signal 246 is the speed governor set point 254. The desired speed governor set point is compared to the actual speed signal 256 to generate an error signal 258, which is the input to the standard speed governor 260, which generates a desired fuel command signal (FSRN) 262 that is representative of the fuel flow required to satisfy the speed/load control requirements.

The actual turbine speed signal 256 is also provided as input to the standard acceleration limiter controller 264. This controller determines the rate of change of turbine rotor speed and compares it to one of several allowable acceleration limits that are a function of turbine operating mode (starting vs. running), and generates a signal FSRACC 266 that is representative of the fuel flow required to limit turbine rotor acceleration to the allowable limit. This control is used during gas turbine starting, and to assist in preventing excessive rotor overspeeding in the event that the generator output connection to the grid is lost.

The gas turbine exhaust temperature is provided as input to the standard exhaust temperature limiter 230 where it is compared to the allowable exhaust temperature that is determined as a function of turbine operating parameters. This allowable exhaust temperature is modified by turbine speed, as previously described, when operating in the F. C. mode. The temperature limiter generates a signal FSRT 268 that is representative of the fuel flow required to limit the exhaust temperature to the allowable level.

The FSRACC signal, FSRN signal and FSRT are fed into a low value selector 270, which selects the lowest value of these signals for use as the fuel flow control signal FSR 272. The FSR signal is applied to the fuel system that supplies fuel to the combustor of the gas turbine. Through adjustments to the fuel flow, the turbine power is controlled in a manner that indirectly adjusts the IGV to the desired angle to maintain the desired reserve power capacity.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a gas turbine having an air inlet with an inlet guide vane, a compressor receiving air from the inlet, a combustor receiving fuel and compressed air from the compressor, and a turbine receiving combustion gases from the combustor and driving the compressor and a generator, a controller regulating the fuel flow to the combustor, where the controller comprises:

an algebraic summing means receiving a signal indicative of an actual angle of the inlet guide vane, and comparing the actual angle of the inlet guide vane to a desired inlet guide vane angle, and the summing means generating an inlet guide vane correction signal when a difference exists between the actual and desired inlet guide vane angles, and a fuel controller adjusting a fuel flow to the combustor in response to the inlet guide vane correction signal.

2. In a gas turbine as in claim 1, the controller further comprising:

a reserve capacity set point input means generating a desired reserve capacity signal, and a processor means for converting the desired reserve capacity signal to a inlet guide vane command signal that includes the desired inlet guide vane angle.

3. In a gas turbine as in claim 1, the controller further comprising a limiter restricting the inlet guide vane correction signal to a predefined range.

4. A method for controlling a gas turbine having a compressor with inlet guide vanes, a combustor receiving compressed air from the compressor and fuel, and a turbine receiving combustion gases from the combustor, where the turbine drives a shaft coupled to the compressor and the load, where the method steps comprise:

A. sensing a rotational speed of the shaft coupled to the compressor;

B. setting a desired angle for the inlet guide vanes;

C. sensing an actual angle of the inlet guide vanes;

D. generating a correction signal indicative of a difference between the actual angle and desired angle of the inlet guide vanes;

E. applying the correction signal to adjust the fuel flowing to the combustor;

F. continuously performing steps (A) to (E) to reduce the difference between the actual angle and desired angle of the inlet guide vanes.

5. A method as in claim 4 wherein step (B) is performed by selecting reserve capacity for the gas turbine and determining the desired angle for the inlet guide vanes from the selected reserve capacity.

* * * * *